United States Patent [19]

Doddapaneni

[11] 4,405,693

[45] Sep. 20, 1983

[54] HIGH RATE METAL-SULFURYL CHLORIDE BATTERIES

[75] Inventor: Narayan Doddapaneni, Glenside, Pa.

[73] Assignee: Honeywell Inc., Minneapolis, Minn.

[21] Appl. No.: 308,337

[22] Filed: Oct. 5, 1981

[51] Int. Cl.³ .............................................. H01M 4/36
[52] U.S. Cl. .................................... 429/101; 429/196; 429/199; 429/212
[58] Field of Search ............... 429/196, 101, 199, 212, 429/105

[56] References Cited

U.S. PATENT DOCUMENTS

| 4,093,784 | 6/1978 | Driscoll | 429/196 X |
| 4,143,214 | 3/1979 | Chang et al. | 429/196 X |
| 4,184,007 | 1/1980 | Urry | 429/196 X |
| 4,218,523 | 8/1980 | Kalnoki-Kis | 429/196 X |
| 4,252,875 | 2/1981 | Venkatasetty | 429/196 |
| 4,327,159 | 4/1982 | Jones et al. | 429/196 X |

*Primary Examiner*—Charles F. Lefevour
*Attorney, Agent, or Firm*—Charles G. Mersereau

[57] ABSTRACT

An electrochemical cell with a lithium anode, an electrolyte solution comprising an electrolyte salt dissolved in sulfuryl chloride and a cathode doped with a macrocyclic complex of a transition metal such as CoPc, FePc, or $(CoPc)_n$.

10 Claims, No Drawings

HIGH RATE METAL-SULFURYL CHLORIDE BATTERIES

BACKGROUND OF THE INVENTION

An electrochemical cell based on lithium-sulfuryl chloride ($Li/SO_2Cl_2$) electrochemical system offers a potentially higher energy performance than the lithium thionyl chloride ($Li/SOCl_2$) system. Poor electrochemical discharge and relatively narrow operating temperature range have, however, hindered a practical cell development. One of the factors believed responsible for poor discharge performance is cathode substrate. High surface area Teflon (trademark of E. I. du Pont DeNemours)-bonded carbon cathodes, where $SO_2Cl_2$ undergoes reduction, and irreversibility of the cathode reaction contribute excessive cathode overpotential. Another factor contributing to premature cell failure, particularly at high discharge rates, is the presence of reactive intermediate reduction species.

SUMMARY OF THE INVENTION

The present invention relates to improved electrochemical current producing cells based on a lithium-sulfuryl chloride system. More particularly, the present invention relates to a catalyzed porous cathode for the reduction of sulfuryl chloride. The catalysts are macrocyclic complexes of transition metals such as polymeric and monomeric cobalt and iron phthalocyanines.

It has been discovered that the rate of $SO_2Cl_2$ reduction can be increased substantially by doping the carbon cathodes with CoPc, FePc and $(CoPc)_n$ catalysts. Both monomeric CoPc and FePc are soluble in acid ($AlCl_3/SO_2Cl_2$) as well as neutral ($LiAlCl_4/SO_2Cl_2$) electrolytes. However, the heat treated (500° to 600° C.) polymeric $(CoPc)_n$, which is synthesized by heating a mixture of 3, 3, 4, 4-benzophenone tetracarboxylic dianhydride (BTDA), $CoCl_2$ and urea at 200° C. for one hour, does not dissolve and is stable in both acid and neutral electrolytes.

A cell according to the present invention comprises a lithium anode, a sulfuryl chloride depolarizer and an electrolyte salt, and a porous carbon cathode doped with a macrocyclic complex of a transition metal, such as FePc, CoPc, or $(CoPc)_n$. A preferred cathode material is Shawinigan carbon black. A binder, such as Teflon (trademark of E. I. du Pont DeNemours) may also be included.

DESCRIPTION OF THE PREFERRED EMBODIMENT

A number of cells were constructed employing a lithium anode, a sulfuryl chloride depolarizer and lithium tetrachloroaluminate electrolyte salt, and carbon cathodes doped with a macrocyclic complex of a transition metal. Experiments, as described below, were performed on these various cells having cathodes catalyed with FePc, CoPc, or $(CoPc)_n$ and compared to a cell with uncatalyzed cathode. Catalyst doping of cathodes can be achieved by mixing the catalyst with carbon before cathode fabrication or, in the case of FePc and CoPc, by dissolving the catalyst in the electrolyte.

Each of the cells for which data is given in Table 1 below comprised a lithium anode, an electrolyte of 1.5 mole solution of lithium tetrachloroaluminate in sulfuryl chloride and a porous carbon cathode.

In the cells with FePc and CoPc, the catalyst doping of the cathodes was accomplished by adding catalyst to the electrolyte. Approximately 3 milligrams of catalyst per cc of electrolyte were used. It has been found, however, that much smaller amount of the catalyst, i.e. less than 0.5 milligrams per cc of electrolyte, produce a significant improvement in the cell operation. On the other hand, much larger amounts of the catalyst will, beyond a certain point, not produce any further improvement.

Cathode doping with $(CoPc)_n$ was accomplished by adding it to the cathode during the manufacture of the cathode. The cathode was formed by mixing $(CoPc)_n$ with Shawinigan carbon black in approximate ratio of 5% to 95% and heat treating the mixture at 550° C. or higher for two or more hours. Upon cooling, a slurry was formed by adding to the mixture a nonaqueous solvent and a binder, such as Teflon. The slurry was then shaped into the desired cathode shape and allowed to dry.

Although in the specific example given here, the ratio of $(CoPc)_n$ to carbon was almost 5% to 95%, it has been found that the amount of $(CoPc)_n$ could vary from 0.5% to 20% by weight, based on the weight of carbon. Preferrably, from 2% to 10% by weight, based on the weight of carbon, is employed.

TABLE 1

POLARIZATION CHARACTERISTICS OF
$Li/SO_2Cl_2$ CELLS WITH VARIOUS CATALYSTS
(1.5 M $LiALCl_4/SO_2Cl_2$ AT 72° F.)

| CURRENT milliamperes per cm² | CELL VOLTAGE - volts | | | |
|---|---|---|---|---|
| | No Catalyst | FePc | CoPc | $(CoPc)_n$ |
| 5 | 3.55 | 3.52 | 3.55 | 3.58 |
| 10 | 3.17 | 3.25 | 3.48 | 3.50 |
| 20 | 3.05 | 3.15 | 3.37 | 3.45 |
| 30 | 3.00 | 3.10 | 3.30 | 3.38 |
| 40 | 2.95 | 3.06 | 3.25 | 3.33 |

As can be seen from Table 1 above, the cells doped with FePc, CoPc, and $(CoPc)_n$ produced significantly higher voltages. The greatest improvement throughout the entire current rate discharge range was shown by the cell having its cathode catalyzed by $(CoPc)_n$.

Table 2 below comparative polarization characteristics of cells similar to those represented by Table 1, but utilizing 2.3 M $AlCl_3/SOCl_2$ as the electrolyte.

TABLE 2

POLARIZATION CHARACTERISTICS OF
$Li/SO_2Cl_2$ CELLS WITH VARIOUS CATALYSTS
(2.3 M $AlCl_3/SO_2Cl_2$ AT 72° F.)

| CURRENT milliamperes per cm² | CELL VOLTAGE - volts | | | |
|---|---|---|---|---|
| | No Catalyst | FePc | CoPc | $(CoPc)_n$ |
| 10 | 3.21 | 3.76 | 3.81 | 3.85 |
| 20 | 3.02 | 3.30 | 3.45 | 3.55 |
| 30 | 2.94 | 3.21 | 3.37 | 3.34 |
| 40 | 2.88 | 3.15 | 3.32 | 3.28 |
| 60 | 2.75 | 3.05 | 3.20 | 3.13 |
| 80 | 2.54 | 2.90 | 3.11 | 3.04 |

Having thus described the invention, what is claimed is:

1. In an electrochemical cell having an alkali metal anode, an electrolyte salt, a sulfuryl chloride depolarizer and a cathode, the improvement comprising a dopant in said cathode, wherein said dopant is one selected from a group consisting of monomeric and polymeric phthalocyanine complexes of iron and cobalt.

2. The electrochemical cell of claim 1 wherein said cathode consists primarily of carbon and wherein said dopant is cobalt phthalocyanine polymer.

3. The electrochemical cell of claim 2 wherein said doped cathode contains from about 0.5% to 20% cobalt phthalocyanine polymer by weight, based on carbon.

4. The electrochemical cell of claim 2 wherein said doped cathode contains from about 2% to 10% cobalt phthalocyanine polymer.

5. The electrochemical cell of any one of claims 2,3 or 4 wherein said cobalt phthalocyanine polymer is admixed with said carbon and heat treated at a temperature of at least 550° C. for at least 2 hours such that said dopant is rendered insoluble in the electrolyte solvent.

6. The electrochemicaal cell of any one of claims 1, or 2 wherein said electrolyte salt is lithium tetrachloroaluminate.

7. The electrochemical cell of any one of claims 1, or 2 wherein said electrolyte salt is aluminum chloride.

8. The electrochemical cell of any one of claims 1, or 2 wherein said anode is lithium.

9. In an electrochemical cell having an alkali metal anode, an electrolyte salt, a sulfuryl chloride depolarizer and a primarily carbon cathode, the improvement comprising an amount of catalyst in said electrolyte wherein said catalyst is one selected from a group consisting of monomer complexes of iron phthalocyanine and cobalt phthalocyanine.

10. The electrochemical cell of claim 9 wherein the amount of said catalyst is from about 0.5 milligram of catalyst per cubic centimeter of electrolyte to about 3.0 milligrams of catalyst per cubic centimeter of electrolyte.

* * * * *